(12) United States Patent
Holzinger

(10) Patent No.: US 8,584,793 B2
(45) Date of Patent: Nov. 19, 2013

(54) DEVICE FOR REDUCING BOOMING NOISE IN A MOTOR VEHICLE

(75) Inventor: Stefan Holzinger, Vienna (AT)

(73) Assignee: Continental Automotive GmbH, Hannover (DE)

( * ) Notice: Subject to any disclaimer, the term of this patent is extended or adjusted under 35 U.S.C. 154(b) by 57 days.

(21) Appl. No.: 13/376,320

(22) PCT Filed: May 28, 2010

(86) PCT No.: PCT/EP2010/057409
§ 371 (c)(1),
(2), (4) Date: Dec. 5, 2011

(87) PCT Pub. No.: WO2010/139622
PCT Pub. Date: Dec. 9, 2010

(65) Prior Publication Data
US 2012/0073898 A1    Mar. 29, 2012

(30) Foreign Application Priority Data

Jun. 4, 2009  (DE) .................. 10 2009 023 890

(51) Int. Cl.
| | |
|---|---|
| *F01N 5/00* | (2006.01) |
| *F01N 5/02* | (2006.01) |
| *G10K 11/16* | (2006.01) |
| *B60J 7/043* | (2006.01) |

(52) U.S. Cl.
USPC ............................ 181/211; 181/296; 296/217

(58) Field of Classification Search
USPC ................... 181/211, 296; 296/217
See application file for complete search history.

(56) References Cited

U.S. PATENT DOCUMENTS

| | | | | |
|---|---|---|---|---|
| 5,431,477 | A | * | 7/1995 | Smith et al. .................... 296/217 |
| 5,734,727 | A | * | 3/1998 | Flaherty et al. .................. 381/86 |
| 6,357,823 | B1 | * | 3/2002 | Birndorfer et al. ........... 296/217 |
| 6,474,730 | B2 | * | 11/2002 | Konermann ................... 296/217 |
| 6,523,889 | B2 | * | 2/2003 | Birndorfer et al. ........... 296/217 |
| 6,786,545 | B2 | * | 9/2004 | Bargheer et al. ............ 297/217.1 |
| 2001/0017479 | A1 | * | 8/2001 | Birndorfer et al. ........... 296/217 |
| 2002/0041116 | A1 | * | 4/2002 | Bogisch et al. ............. 297/180.1 |
| 2002/0063446 | A1 | * | 5/2002 | Konermann ................... 296/217 |
| 2008/0113600 | A1 | * | 5/2008 | Kim ............................... 454/105 |
| 2009/0015042 | A1 | * | 1/2009 | Bargheer et al. ......... 297/180.12 |
| 2009/0085382 | A1 | * | 4/2009 | Bergmiller et al. ....... 296/216.09 |
| 2009/0217608 | A1 | * | 9/2009 | Braun et al. ................. 52/302.1 |

(Continued)

FOREIGN PATENT DOCUMENTS

| | | |
|---|---|---|
| DE | 3512312 A1 | * 10/1985 |
| DE | 9201474.7 | 5/1992 |

(Continued)

OTHER PUBLICATIONS

International PCT Search Report and Written Opinion, PCT/EP2010/057409, 22 pages, Jul. 13, 2010.

*Primary Examiner* — David Warren
*Assistant Examiner* — Christina Russell
(74) *Attorney, Agent, or Firm* — King & Spalding L.L.P.

(57) ABSTRACT

A device for reducing booming noise in a motor vehicle has a wind deflector (3) having openings. The device furthermore has an air source (1), which is arranged in the motor vehicle and connected to the wind deflector. The air provided by the air source can be channeled to the wind deflector and released through the openings (4) thereof.

17 Claims, 1 Drawing Sheet

(56) References Cited

U.S. PATENT DOCUMENTS

| | | | |
|---|---|---|---|
| 2011/0260504 A1* | 10/2011 | Faerber et al. | 296/216.08 |
| 2011/0285180 A1* | 11/2011 | Kohout et al. | 296/217 |
| 2012/0112677 A1* | 5/2012 | Egger et al. | 318/453 |

FOREIGN PATENT DOCUMENTS

| | | | |
|---|---|---|---|
| DE | 19633188 C1 * | 7/1997 | |
| DE | 0916536 A2 | 10/1998 | |
| DE | 19750218 A1 | 5/1999 | |
| DE | 19807175 C1 | 9/1999 | |
| DE | 19958742 A1 | 6/2001 | |
| DE | 19958748 A1 | 6/2001 | |
| DE | 10056754 A1 | 5/2002 | |
| DE | 10323808 A1 * | 1/2005 | |
| DE | 102006015943 B3 | 2/2007 | |
| DE | 102006056372 A1 | 5/2008 | |
| EP | 916536 A2 * | 5/1999 | |
| JP | 2006327489 A * | 12/2006 | |

* cited by examiner

DEVICE FOR REDUCING BOOMING NOISE IN A MOTOR VEHICLE

CROSS-REFERENCE TO RELATED APPLICATIONS

This application is a U.S. National Stage Application of International Application No. PCT/EP2010/057409 filed May 28, 2010, which designates the United States of America, and claims priority to DE Application No. 10 2009 023 890.5 filed Jun. 4, 2009, the contents of which are hereby incorporated by reference in their entirety.

TECHNICAL FIELD

The invention relates to a device for reducing booming noise in a motor vehicle.

BACKGROUND

In motor vehicles, during travel resonances occur during which the passenger compartment of the motor vehicle is excited by an open window or open sunroof. The passenger compartment of the motor vehicle acts here as a Helmholtz resonator whose actual frequency depends essentially on the volume of the passenger compartment of the motor vehicle. When a resonance occurs, coherent vortex structures are shed at the front edge of the window opening or sunroof opening, and they strike the rear edge and lead there to pressure waves which excite the passenger compartment of the vehicle and lead in turn to the occurrence of new vortex shedding at the front edge of the opening.

Whether or not resonance occurs is dependent on the relative speed of the vortex structures, which speed is in turn influenced by the instantaneous speed of the motor vehicle. What is referred to as booming noise occurs only in limited speed ranges, but is unpleasant for the occupants of the motor vehicle since such noise is associated with sound pressures of up to approximately 130 dB at frequencies of around 20 Hz.

A reduction in this sound pressure and therefore a reduction in the booming noise can basically be brought about by preventing the vortex structures from striking the rear edge of the window opening or sunroof opening of the motor vehicle.

For this purpose, it has already been proposed to bring about a reduction in booming noise by moving the sunroof of a motor vehicle into a comfort position in which the angle of aperture of the sunroof is restricted.

Furthermore, for this purpose it has already been proposed to position a wind deflector in front of the sunroof in order to move the point where the shedding formed at the front edge strikes regions behind the sunroof opening.

Furthermore, it is already known to provide such a wind deflector with vortex generators which disrupt the regulatory of the specified shedding. Such vortex generators are, for example, notches, slits, grooves, knobs or drilled holes in the wind deflector or tongues which are provided at a suitable location and which oscillate in the air stream.

In addition, it has already been proposed to reduce sunroof booming by mounting a movable lip on the front edge of the sunroof, wherein this movable lip is excited by actuators, for example with a noise signal, and in this way said lip disrupts the periodic excitation. The use of such a movable lip is described, for example, in section 7.3.6 on pages 443-445 of the book Aerodynamic des Automobils [Motor vehicle aerodynamics], Vieweg+Täubner, $5^{th}$ edition, ISBN 9783-3-528-03959-2, by Wolf-Heinrich Hucho.

DE 100 56 754 A1 discloses a wind deflector for a sunroof opening of a motor vehicle whose wind deflector profile has, on an end side thereof, a series of air inlet openings which are arranged distributed over the width of said wind deflector profile, and has on an adjacent profile side a row with air outlet openings. The wind deflector profile is embodied as a hollow profile, wherein the upper boundary wall of the wind deflector profile is penetrated by the air outlet openings.

DE 199 58 748 B4 discloses a device for influencing the air stream in the region of the roof opening of a vehicle roof. This known device has a wind deflector which is arranged in a vertically adjustable fashion in the region of the front edge of the roof opening between a position of rest, in which the upper side of the wind deflector does not project beyond the fixed roof surface, and a first extended position. In this first extended position, the upper side of the wind deflector projects beyond the fixed roof surface. An air stream which flows over the vehicle roof is directed exclusively over the upper side of the wind deflector. Furthermore, the specified wind deflector can be moved into a second extended position in which an air stream which flows over the vehicle roof is directed through at least partially under the wind deflector, in order to reduce booming noise.

SUMMARY

According to various embodiments, a device for reducing booming noise in a motor vehicle can be specified, which device has a wind deflector provided with openings, wherein the probability of blockage of the openings is reduced.

According to an embodiment, a device for reducing booming noise in a motor vehicle, may comprise a wind deflector provided with openings, and an air source which is arranged in the motor vehicle, wherein the air source is connected to the wind deflector, and wherein the air which is made available by the air source can be fed to the wind deflector and can be output through the openings thereof.

According to a further embodiment, the openings of the wind deflector can be notches, slits, grooves or holes. According to a further embodiment, said device may have a control unit which is connected to the air source and is provided for actuating the air source. According to a further embodiment, said device may have a sensor system which is connected to the control unit. According to a further embodiment, the sensor system may have a vehicle speed sensor, and the control unit actuates the air source as a function of the output signals of the vehicle speed sensor. According to a further embodiment, the sensor system may have a pressure sensor, and the control unit actuates the air source as a function of the output signals of the pressure sensor. According to a further embodiment, the sensor system may have a microphone, and the control unit actuates the air source as a function of the output signals of the microphone. According to a further embodiment, the air source can be connected to the wind deflector via a hose, and the air which is made available by the air source can be fed to the wind deflector via the hose. According to a further embodiment, the air source can be connected to the hose via a modulator, the modulator is connected to the control unit, and the control unit is provided for controlling the modulator. According to a further embodiment, the control unit may make available a random signal for controlling the modulator. According to a further embodiment, the control unit may control the modulator as a function of the output signals of the sensor system. According to a further embodiment, the air source can be a compressor. According to a further embodiment, the compressor can be a loudspeaker which acts as a diaphragm pump. According to a further embodiment, the air source can be an impeller wheel.

BRIEF DESCRIPTION OF THE DRAWINGS

Exemplary embodiments will be explained in more detail below with reference to the drawings, in which.

DETAILED DESCRIPTION

According to various embodiments, the device for reducing booming noise has an air source which is arranged in the motor vehicle and is connected to the wind deflector, wherein the air which is made available by the air source is fed to the wind deflector and output through the openings thereof. The air which is output through the openings of the wind deflector disrupts or modifies the through the air stream entering the opening of the motor vehicle from the outside, with the result that no periodic excitation occurs. This causes booming noise to be reduced. Since the air which is made available by the air source flows in the direction of the wind deflector from the passenger compartment of the vehicle, there is no risk, or only very slight risk, of soiling or blocking of the openings of the wind deflector since air, which generally contains particles from the environment, is not applied to the openings from the outside.

One embodiment consists in providing a control unit which is connected to the air source and is provided for actuating the air source. This actuation can easily be performed in such a way that the control unit activates and deactivates the air source as a function of the instantaneously occurring vehicle speed which is sensed by means of a velocity sensor. A further refinement consists in the fact that the sensor system is additionally equipped with a pressure sensor and/or a microphone and the air stream which is output by the air source is modulated as a function of the output signals of the sensor system. An advantage of this refinement consists in the fact that the activation of the air source and the modulation of the air stream generated by the air source are performed in a selective fashion as a function of the output signals of the sensor system. This both prevents unnecessary activation of the air source and also provides the possibility of selectively changing the air stream made available by the air source, in order to optimize the reduction in booming noise.

Further advantages consist in the fact that the wind deflector itself does not require any movable parts whatsoever. Said wind deflector may be manufactured as a plastic component which is configured in a comparatively simple way, with a high degree of design freedom. There is no need for any installations at all in the wind deflector, with the result that said wind deflector can be easily configured with respect to its weight. There is no need for moving parts to be lubricated during operation of the vehicle.

Figure 1:
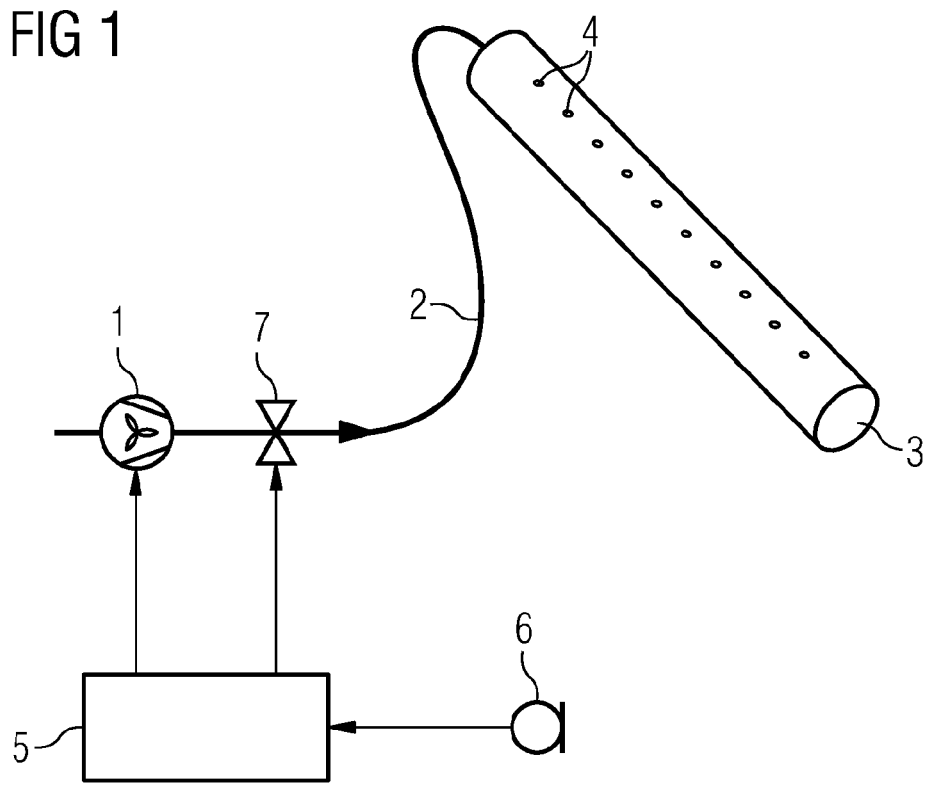
FIG. 1 shows a sketch of a device for reducing booming noise in a motor vehicle.

FIG. 1 shows a sketch of a device for reducing booming noise in a motor vehicle, in which sketch the components which are necessary to understand various embodiments are illustrated.

The device which is shown has an air source 1, a hose 2, a wind deflector 3 which is provided with openings 4, a control unit 5, a sensor system 6 and a modulator 7. The air source 1, the control unit 5 and the modulator 7 are positioned within a motor vehicle. The wind deflector 3 is arranged in a customary fashion in front of the sunroof (not shown) of the motor vehicle. The hose 2 leads from the wind deflector 3 into the interior of the motor vehicle. The sensor system 6 has, as is explained further below, a vehicle speed sensor and/or a pressure sensor and/or a microphone.

The control unit 5 is connected to the sensor system 6, for example via a vehicle bus, and is provided for receiving the sensor signals made available by the sensor system. In addition, the control unit 5 is connected to the air source 1 and is provided for controlling the air source 1. Furthermore, the control unit 5 is connected to the modulator 7 and is provided for controlling the modulator 7.

The air source 1, which may be a compressor of any desired design, is connected via the modulator 7 and the hose 2 to the wind deflector 3, wherein the air which is made available by the air source 1 is fed either via the modulator 7 and the hose 2 or directly via the hose 2, as indicated by a dashed line in FIG. 1, to the wind deflector 3 and is output through the openings thereof. The air which is output through the openings 4 of the wind deflector counteracts the air stream which enters from the outside through the sunroof of the motor vehicle, and as a result disrupts the periodic excitation caused by the air stream entering from the outside, and therefore reduces booming noise.

The openings 4 of the wind deflector 3 through which the air which is made available by the air source 1 is output are notches, slits, grooves or holes which are made in the wind deflector 3.

According to a first embodiment, the device which is shown in FIG. 1 operates as follows:

The control unit 5 receives sensor signals from the sensor system 6 which has a vehicle speed sensor. If these sensor signals indicate that the instantaneous vehicle speed is in a predefined speed range in which booming noise occurs, the control unit 5 activates the air source 1, insofar as the sunroof of the vehicle is open. The air which is made available by the air source 1 is fed, either without modulation or after modulation in the modulator 7, via the hose 2 to the wind deflector 3 and is output through the openings thereof.

In the case of modulation, the control unit 5 can influence the modulation process as a function of the instantaneous vehicle speed in such a way that the quantity of air which is output through the openings 4 is optimized in a respectively necessary fashion. The speed range in which booming noise occurs in the present motor vehicle was determined in advance by trials at the works as a function of the type of vehicle and was stored in a non-volatile fashion in a memory within the scope of the fabrication of the vehicle. During the driving operation, the control unit 5 accesses these stored data and takes them into account in the actuation of the air source 1 or of the modulator 7.

As an alternative to this, the control unit 5 can make available a random signal for controlling the modulator 7 when the instantaneous vehicle speed is in the speed range in which booming noise occurs.

According to a second embodiment, the device which is shown in FIG. 1 operates as follows:

The control unit 5 receives sensor signals from the sensor system 6 which has a pressure sensor and/or a microphone. If these sensor signals indicate that booming noise is occurring, the control unit 5 activates the air source 1, if the sunroof of the vehicle is open. If the sensor system 6 additionally has a speed sensor, the control unit can also take into account the output signals thereof in this evaluation of the sensor signals. The air which is made available by the air source 1 is fed, either without modulation or after modulation in the modulator 7, via the hose 2 to the wind deflector 3 and is output through the openings 4 thereof.

In the case of modulation, the control unit 5 can modulate the modulation process as a function of the measured pressure, in order to optimize the quantity of air which is output through the openings, in such a way that the generation of resonance is counteracted in a respectively necessary fashion.

Figure 2:
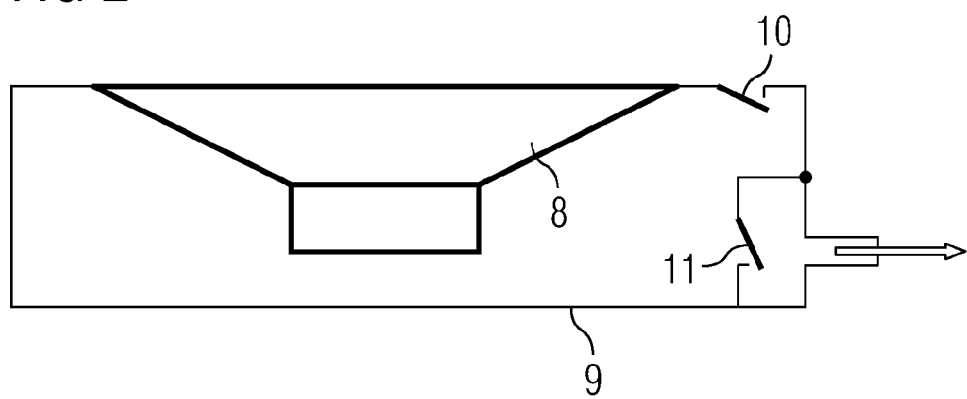
FIG. 2 shows a sketch of an embodiment of an air source.

FIG. 2 shows a sketch of a specific embodiment of the air source 1 according to which a loudspeaker 8 which acts as a diaphragm pump is used as an air source. This loudspeaker 8 is installed in a housing 9 which has non-return valves 10 and 11 in order to generate a directed air stream. In this embodiment there is no need for separate modulation of the air stream which is made available by the loudspeaker 8, since the modulation is brought about directly by the loudspeaker 8.

An embodiment which is not illustrated in the figures consists in implementing the air source 1 by means of an impeller wheel with a large diameter. The air vanes of said impeller wheel are constructed in such a way that modulation of the air stream made available by the impeller wheel can be dispensed with. However, the rotational speed of the impeller wheel and the phase angle thereof are preferably adjusted as a function of the output signals of the sensor system 6, in order to optimize the suppression of booming noise. As an alternative to this, there is the possibility of positioning the blades of the impeller wheel in an arrhythmic fashion.

In the light of the above, various embodiments relate to a device and method for reducing booming noise in a motor vehicle, which device has a wind deflector provided with openings, wherein an air source which is arranged in the motor vehicle is provided. This air source is connected to the wind deflector. The air which is made available by the air source is fed to the wind deflector and output through the openings thereof. Said air therefore counteracts occurrence of the booming noise which is brought about by the dynamic wind or the external air stream. The booming noise is preferably actively reduced in the sense that the control unit 5 actuates the air source 1 and/or the modulator 7 as a function of the output signals of the sensor system 6, in order to optimize the reduction in booming noise.

The wind deflector which is provided according to various embodiments has in its interior a cavity or ducts through which the air which is made available by the air source is transported in the interior of the wind deflector to the openings 4. Said wind deflector advantageously does not require any moving parts whatsoever and can be implemented with a high degree of design freedom in the form of a relatively simple, comparatively lightweight plastic component. There is no need for any installations at all in the wind deflector and there is also no need for lubrication. There is advantageously no probability, or only a very slight probability, of soiling or even of blocking the openings 4, since the air does not flow from the outside to the inside but is instead directed outward from the passenger compartment in which the air source 1 is located.

What is claimed is:

1. A device for reducing booming noise in a motor vehicle, which device comprises:
   a wind deflector including openings,
   an air source arranged in the motor vehicle and configured to supply air, to the wind deflector, such that the air supplied to the wind deflector exits the wind deflector through the openings,
   a modulator arranged between the air source and the wind deflector, and
   a control unit configured to control the modulator.

2. The device according to claim 1, wherein the openings of the wind deflector are notches, slits, grooves or holes.

3. The device according to claim 1, wherein the control unit is connected to the air source and is configured to actuate the air source.

4. The device according to claim 1, wherein said device has a sensor system which is connected to the control unit.

5. The device according to claim 4, wherein the sensor system has a vehicle speed sensor, and the control unit actuates the air source as a function of the output signals of the vehicle speed sensor.

6. The device according to claim 4, wherein the sensor system has a pressure sensor, and the control unit actuates the air source as a function of the output signals of the pressure sensor.

7. The device according to claim 4, wherein the sensor system has a microphone, and the control unit actuates the air source as a function of the output signals of the microphone.

8. The device according to claim 1, wherein the control unit is configured to control the modulator using a random signal.

9. The device according to claim 1, comprising a sensor system, wherein the control unit is configured to control the modulator as a function of output signals of the sensor system.

10. The device according to claim 1, wherein the air source is a compressor.

11. The device according to claim 10, wherein the compressor is a loudspeaker which acts as a diaphragm pump.

12. The device according to claim 1, wherein the air source is an impeller wheel.

13. A method for reducing booming noise in a motor vehicle, comprising:
    providing a wind deflector including openings,
    arranging an air source in the motor vehicle,
    configuring the air source to supply air to the wind deflector, such that the air supplied to the wind deflector exits the wind deflector through the openings,
    arranging a modulator between the air source and the wind deflector, and
    arranging a control unit to control the modulator.

14. The method according to claim 13, further comprising: actuating the air source by the control unit which is connected to the air source.

15. The method according to claim 13, further comprising: sensing a speed by a vehicle speed sensor, and actuating the air source as a function of the output signals of the vehicle speed sensor.

16. The method according to claim 13, further comprising: sensing a pressure by a pressure sensor, and actuating the air source as a function of the output signals of the pressure sensor.

17. The method according to claim 13, further comprising: measuring a noise level by a microphone, and actuating the air source as a function of the output signals of the microphone.

* * * * *